United States Patent
Yoshida

(10) Patent No.: US 9,950,285 B2
(45) Date of Patent: Apr. 24, 2018

(54) CONTROL VALVE FILTER AND CONTROL VALVE INSERTION STRUCTURE

(71) Applicant: MIKUNI CORPORATION, Tokyo (JP)

(72) Inventor: Junichi Yoshida, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 661 days.

(21) Appl. No.: 14/561,268

(22) Filed: Dec. 5, 2014

(65) Prior Publication Data
US 2015/0083243 A1   Mar. 26, 2015

Related U.S. Application Data

(63) Continuation of application No. PCT/JP2013/065428, filed on Jun. 4, 2013.

(30) Foreign Application Priority Data

Jun. 8, 2012  (JP) .................................. 2012-131138

(51) Int. Cl.
*B01D 35/02* (2006.01)
*F16K 27/04* (2006.01)
(Continued)

(52) U.S. Cl.
CPC ............ *B01D 35/02* (2013.01); *B01D 29/112* (2013.01); *F01L 1/344* (2013.01);
(Continued)

(58) Field of Classification Search
CPC .... B01D 29/15; B01D 29/112; B01D 29/114; B01D 35/02; B01D 2201/0415;
(Continued)

(56) References Cited

U.S. PATENT DOCUMENTS 5,001,816 A   3/1991  Oetiker
5,150,503 A   9/1992  Müller
(Continued)

FOREIGN PATENT DOCUMENTS

CN        102239314 A      11/2011
DE    102011107352 A1 *    6/2012  ........... B01D 29/112
(Continued)

OTHER PUBLICATIONS

Extended European Search Report dated Feb. 1, 2016 in corresponding European Patent Application No. 13800123.5.
(Continued)

*Primary Examiner* — Terry K Cecil

(57) ABSTRACT

A first engagement unit and a second engagement unit are formed to be engaged with each other at a divided portion formed in a substantially ring-shaped frame of a control valve filter. The first engagement unit includes a first inclination surface and a recessed portion. The second engagement unit includes a second inclination surface capable of coming into close contact with the first inclination surface and a projection portion engaged with the recessed portion. The recessed portion and the projection portion are engaged from the diameter direction of the frame, and the first inclination surface and the second inclination surface are in close contact with each other, whereby the first engagement unit and the second engagement unit are engaged with each there, and therefore, the recessed portion and the projection portion can be prevented from being deformed or damaged.

11 Claims, 5 Drawing Sheets

(51) Int. Cl.
  *B01D 29/11* (2006.01)
  *F01L 1/344* (2006.01)
  *F16K 11/07* (2006.01)
  *F16K 31/06* (2006.01)
  *F16B 2/08* (2006.01)

(52) U.S. Cl.
  CPC ........ *F16K 11/0716* (2013.01); *F16K 27/041* (2013.01); *F16K 31/0613* (2013.01); *B01D 2201/4084* (2013.01); *F01L 2001/3444* (2013.01); *F01L 2001/34426* (2013.01); *F16B 2/08* (2013.01); *Y10T 137/794* (2015.04)

(58) Field of Classification Search
  CPC .... B01D 2201/4084; F01L 2001/34426; F01L 2001/3443; F01L 2001/34433; F01L 2001/34436; F01L 2001/3444; F16B 3/04; F01M 11/03; Y10T 24/148
  See application file for complete search history.

(56) References Cited

U.S. PATENT DOCUMENTS

| 5,169,524 | A | 12/1992 | Meiritz et al. |
| 5,807,483 | A | 9/1998 | Cassidy et al. |
| 5,820,754 | A | 10/1998 | Cassidy et al. |
| 7,041,217 | B1 * | 5/2006 | Close .................. B01D 29/111 210/232 |
| 8,950,588 | B2 * | 2/2015 | Yonezawa ............ F16K 11/07 210/232 |
| 2011/0084018 | A1 | 4/2011 | Hoppe et al. |

FOREIGN PATENT DOCUMENTS

| JP | 56-95632 | 12/1954 |
| JP | 2-10760 | 3/1990 |
| JP | 2-292506 | 12/1990 |
| JP | 7-65604 | 7/1995 |
| JP | 9-88918 | 3/1997 |
| JP | 2001-173806 | 6/2001 |
| JP | 2002-285966 | 10/2002 |
| JP | 2007-2958 | 1/2007 |
| WO | WO 2011/032539 A1 | 3/2011 |

OTHER PUBLICATIONS

International Search Report dated Jul. 2, 2013, in corresponding International Patent Application No. PCT/JP2013/065428.

* cited by examiner

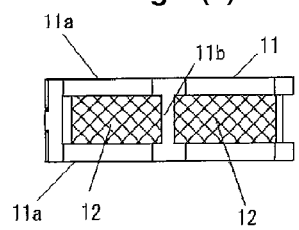
Fig. 3(c)
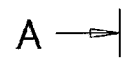
Fig. 3(b)
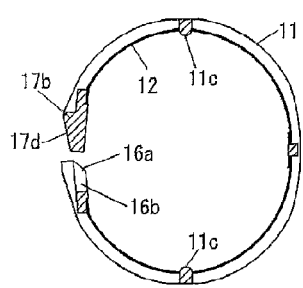
Fig. 3(d)
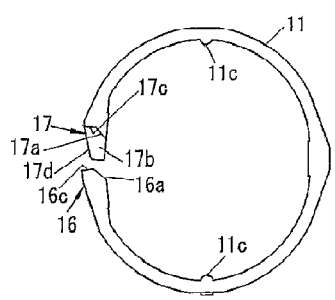
Fig. 3(a)
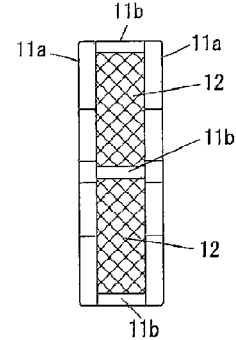
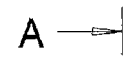

CONTROL VALVE FILTER AND CONTROL VALVE INSERTION STRUCTURE

CROSS-REFERENCE TO RELATED APPLICATION(S)

This application is a continuation application, filed under 35 U.S.C. § 111(a), of International Application PCT/JP2013/065428, filed on Jun. 4, 2013, which claims the foreign priority benefit of Japanese Patent Application No. 2012-131138, filed Jun. 8, 2012, the disclosures of which are incorporated herein by reference.

BACKGROUND

1. Field

Embodiments of the present invention relate to a control valve filter and a control valve insertion structure, which are attached to an external periphery of a control valve to prevent a foreign object from mixing into the control valve.

2. Description of Related Art

A hydraulic control system of an engine and the like uses many control valves for controlling the hydraulic pressure of a control fluid such as oil or switching the hydraulic path. With such a control valve, when a foreign object mixed in the oil enters into the main body of the control valve or the foreign object is discharged therefrom, a sliding member such as a valve plug provided in the inside of the control valve may fail to perform stable operation, or there may be a malfunction in the operation of an actuator operated hydraulically, and therefore, a port unit which is formed to be open in the external periphery of the main body of the control valve is covered with a control valve filter, which prevents a foreign object mixed in oil from flowing to the actuator.

What is described in Patent Literature 1 to Patent Literature 3 are known as such control valve filters.

A control valve filter as described in Patent Literature 1 includes a substantially ring-shaped frame and a filter member provided on this frame, and a divided portion is formed at a portion of the frame, and an engagement unit is formed at this divided portion. This engagement unit is formed with a recessed portion and a projection portion, and the recessed portion and the projection portion are brought closer to each other in a peripheral direction, and the recessed portion and the projection portion are engaged with each other by a fitting which is called snap-fit, i.e., the projection portion is elastically pushed into the recessed portion to be fit thereinto.

Patent Literature 1 also indicates that the divided portion of the substantially ring-shaped frame is fit into a stud, and is coupled by spot welding.

A control valve filter as described in Patent Literature 2 includes a substantially ring-shaped frame and a filter member provided on this frame, and a divided portion is formed at a portion of the frame. One end of the divided portion is provided with a hook unit whose end is bent in such a manner that the hook unit protrudes to the other end of the divided portion, and the other end of the divided portion is provided with a retaining unit capable of engaging with the hook unit, and further, a claw unit is provided on the frame. Then, the hook unit is pushed into the retaining unit while the claw unit is elastically pushed, so that the hook unit is engaged with the retaining unit.

A control valve filter as described in Patent Literature 3 includes a substantially ring-shaped frame and a filter member provided on this frame, and a divided portion is formed at a portion of the frame. First and second abutment units engaging with each other are formed at the divided portion. The first abutment unit is formed with first and second elastic engagement units extending in a substantially tangential line direction so that the first and second elastic engagement units are displaced in a plate thickness direction with a width substantially half of the width in the width direction of the frame body, and the second abutment unit is formed with third and fourth elastic engagement units engaging with the first and second elastic engagement units, respectively, in such a manner that the third and fourth elastic engagement units extend in a substantially tangential line direction so that the third and fourth elastic engagement units are displaced in a plate thickness direction with a width substantially half of the width in the width direction of the frame body, and the third and fourth elastic engagement units are formed to face the first and second elastic engagement units, respectively, so that the third and fourth elastic engagement units are displaced oppositely in the plate thickness direction. Then, the first and second elastic engagement units are engaged with the third and fourth elastic engagement units, respectively, so that the divided portion is engaged.

PATENT LITERATURE

Patent Literature 1: Japanese Publication No. 2000-266235 A

Patent Literature 2: Japanese Publication No. 2002-285966 A

Patent Literature 3: Japanese Publication No. 2007-791 A

SUMMARY

However, in the control valve filter described in Patent Literature 1, when the control valve filter is attached to the control valve, the projection portion is fit into the recessed portion by the so-called snap-fit, whereby the recessed portion and the projection portion are engaged with each other. Therefore, there is a problem in that the recessed portion and the projection portion are easily deformed. When the divided portion of the substantially ring-shaped frame is fit into the stud, the number of components increases because of the stud, and it is troublesome to assemble this stud. Further, when the divided portion is connected by spot welding, it is necessary to prepare welding equipment and requires a welding step, which increases the trouble and the cost.

In the control valve filter described in Patent Literature 2, the shapes of the three members which are the hook unit, the retaining unit, and the claw unit are relatively complicated, and therefore, it is troublesome to produce the control valve filter, and further, because the hook unit is fit into the retaining unit by so-called snap-fit, thin-walled portions of the hook unit and the claw unit may be deformed or damaged.

Further, in the control valve filter described in Patent Literature 3, the first and second elastic engagement units are engaged with the third and fourth elastic engagement units, respectively, and more specifically, the divided portion is engaged by snap-fit, and therefore, the thin-walled portion of the elastic engagement unit may be deformed or damaged.

In addition, the thickness (the material thickness) of the engagement unit made by engaging the first and second elastic engagement units and the third and fourth elastic engagement units is relatively thick, and therefore, this increases the gap between the inner peripheral surface of the control valve filter and the external peripheral surface of the control valve to which the control valve filter is attached, and the projection portion on the inner side of the filter, which is provided as a stopper for stopping rotation, may not work.

Embodiments of the present invention are made in view of such circumstances, and it is an object of the embodiments of the present invention to provide a control valve filter which does not require more components or require more steps in production, and is less likely to be deformed or damaged when attached to the control valve, and further, of which engagement is not detached, and to provide a control valve insertion structure of which engagement unit is not detached, and of which projection portion serving as a stopper for stopping rotation at the inside of the filter functions reliably.

To achieve the above object, a control valve filter is attached to a peripheral groove formed on an external peripheral surface of a control valve, and is configured to filter a fluid flowing into or out of a port unit which is opened through the peripheral groove, comprising a substantially ring-shaped frame and a filter member provided on the frame, wherein a divided portion is formed at a portion of the frame, the divided portion is formed with a first engagement unit and a second engagement unit engaging with each other, the first engagement unit has a recessed portion, the second engagement unit has a projection portion capable of engaging with the recessed portion, a width of an opening portion of the recessed portion is formed to be narrower than that at a deeper side, and the recessed portion and the projection portion are engaged with each other from a diameter direction of the frame, whereby the first engagement unit and the second engagement unit are engaged with each other.

When attached to the peripheral groove formed on the external peripheral surface of the control valve, the recessed portion and the projection portion are engaged with each other from the diameter direction of the frame, so that the first engagement unit and the second engagement unit are engaged, which is not engagement based on so-called snap-fit, and therefore, the recessed portion and the projection portion are prevented from being deformed or damaged.

The first engagement unit has the recessed portion, and the second engagement unit has the projection portion, which is a relatively simple shape, and therefore, more components are not required, and this saves the trouble in the production.

In the above configuration, an upper surface of the projection portion is preferably an inclination surface which is extending to an end of the projection portion so as to incline to the inner side in the diameter direction of the frame.

Therefore, when the first engagement unit and the second engagement unit are engaged with each other, the first engagement unit is overridden on the inclination surface of the projection portion, and thereafter, the it is caused to slide along the inclination surface at the inner side in the diameter direction of the frame, whereby the recessed portion can be easily engaged with the projection portion.

Further, in the above configuration, it may be desirable that the first engagement unit has a first inclination surface which is inclined with respect to a thickness direction of the frame, the second engagement unit has a second inclination surface capable of being in close contact with the first inclination surface, and when the recessed portion and the projection portion are engaged from the diameter direction of the frame, the first inclination surface and the second inclination surface are in contact with each other.

Therefore, when the recessed portion and the projection portion are engaged from the diameter direction of the frame, the first inclination surface and the second inclination surface are in contact with each other, and therefore, the recessed portion and the projection portion can be smoothly engaged with each other.

Further, in the above configuration, it may be preferable that the first engagement unit has a first contact surface in parallel with a thickness direction of the frame, the second engagement unit has a second contact surface in parallel with the thickness direction of the frame, and when the first inclination surface and the second inclination surface are in close contact with each other, the first contact surface and the second contact surface are in contact with each other.

Therefore, the first inclination surface and the second inclination surface can be positioned to be reliably brought into close contact with each other, and this can prevent the first inclination surface and the second inclination surface from slipping.

A control valve insertion structure in which a control valve having the control valve filter according to any of the various embodiments disclosed herein is inserted into an attachment hole formed in a device, wherein a thickness of an engagement unit obtained by engaging the first engagement unit and the second engagement unit of the control valve filter is larger than a gap between an external peripheral surface of the frame and the attachment hole.

The thickness of the engagement unit of the control filter is more than the gap between the external peripheral surface of the frame and the attachment hole, and therefore, this does not increase the gap between the inner peripheral surface of the control valve filter and the external peripheral surface of the control valve having the control valve filter attached thereto. Therefore, the engagement unit is less likely to be detached, and the projection portion can function effectively, which is provided at the inner side of the filter to serve as the stopper of rotation.

According to the control valve filter, more components are not required or more steps are not required in production, and the control valve filter is less likely to be deformed or damaged when attached to the control valve.

According to the control valve insertion structure, the control valve filter engagement unit is not detached because of the hydraulic pressure of the control fluid, and the projection portion serving as a stopper for stopping rotation at the inside of the filter functions reliably.

BRIEF DESCRIPTION OF DRAWINGS

These and/or other aspects and advantages will become apparent and more readily appreciated from the following description of the embodiments, taken in conjunction with the accompanying drawings of which:

FIG. 1(a) is a side view, and FIG. 1(b) is a cross sectional view;

FIG. 2(a) is a side view, and FIG. 2(b) is a front view;

FIGS. 3(a) through 3(d) illustrate an example of a control valve filter, and FIG. 3(a) is a side view illustrating a state when the engagement unit is detached, FIG. 3(b) is a front view thereof, FIG. 3(c) is a plan view thereof, and FIG. 3(d) is a cross sectional view thereof taken along line A-A of FIG. 3(b);

DESCRIPTION OF EMBODIMENTS

Hereinafter, embodiments of the present invention will be explained with reference to drawings.

Figure 1A:
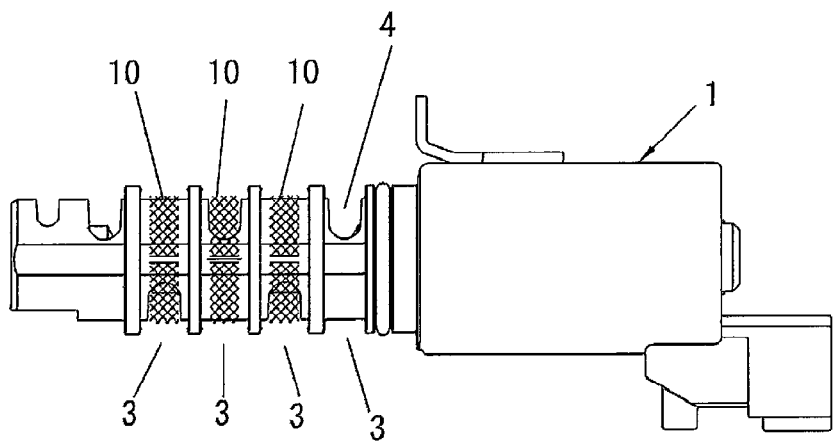
FIGS. 1(a) and 1(b) illustrate an example of a control valve to which a control valve filter is attached.
Figure 1B:
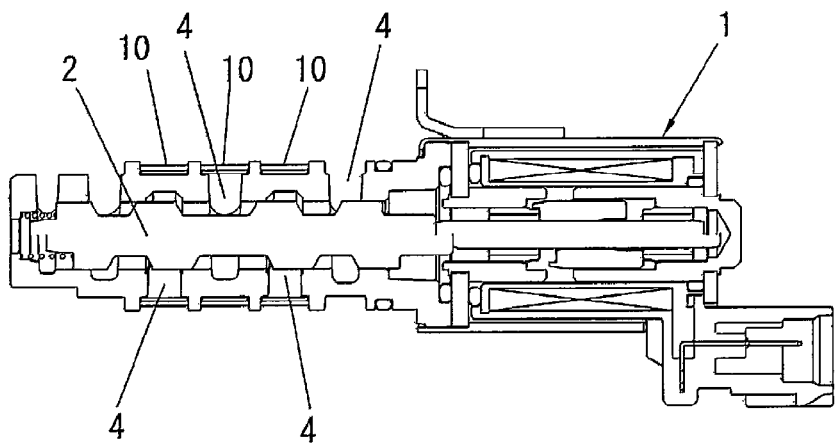

FIGS. 1(a) and 1(b) illustrate a control valve to which a control valve filter is attached. In the inside of a control valve 1, a spool valve 2 is accommodated slidably in the axial direction. Multiple peripheral grooves 3 are formed on the external peripheral surface of the main body of the control valve 1 with a predetermined interval in the axial direction, and a port unit 4 is formed to be open and to penetrate into the inside of each peripheral groove 3. The spool valve 2 operates to move back and forth in the control valve 1, so that each port unit 4 is selectively caused to be in communication.

The control valve 1 is configured to switch the flow path of the fluid, and for example, the control valve 1 is interposed in a hydraulic circuit driving a variable valve timing mechanism of an engine. More specifically, when the spool valve accommodated in the inside of the main body of the control valve 1 moves in the axial direction, for example, the first port unit 4 is selectively caused to be in communication with port units 4, 4 provided at both sides thereof, so that the hydraulic path is switched to change the relative position between a cam sprocket rotating in synchronization with the crank shaft and a cam shaft provided in connection with this cam sprocket. When the relative position between the cam sprocket and the cam shaft is changed, the valve timing of the intake valve or the exhaust valve operated to be open or closed by the cam shaft can be changed in accordance with the operation state.

Figure 4:
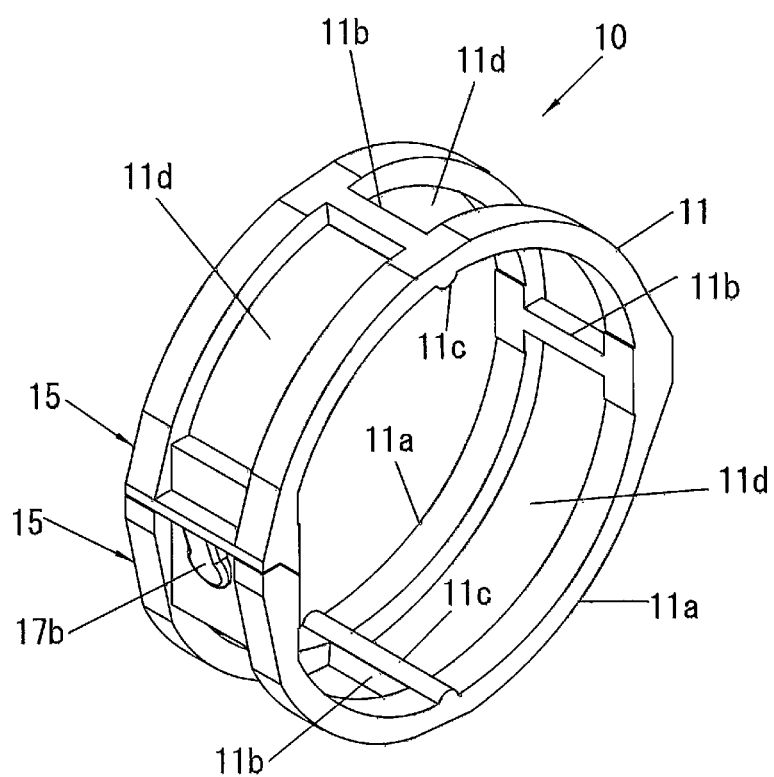
FIG. 4 is a perspective view illustrating an example of a control valve filter.

A control valve filter 10 is attached to the peripheral groove 3. As shown in FIGS. 2 to 4, this control valve filter 10 includes a frame 11 and a filter member 12 provided on this frame 11, and the control valve filter 10 has a divided portion 15 formed at a portion of the frame 11 in the peripheral direction.

FIG. 4 shows only the frame 11, and the filter member 12 is omitted in FIG. 4.

The frame 11 is integrally formed in a substantially annular ring shape with resin, and has some degree of elasticity. The frame 11 has such a structure that two ring members 11a, 11a arranged in parallel with each other and away from each other are connected by multiple connection members 11b, and the connection members 11b are arranged with a predetermined interval in the peripheral direction of the ring member 11a.

Further, projection portions 11c, 11c, which function as a stopper for stopping rotation in the peripheral direction when the control valve filter 10 is attached to the peripheral groove 3, are formed on the inner peripheral surface of the frame 11. The projection portions 11c, 11c are formed on the back surface of two of the three connection members 11b, i.e., the two connection members 11b, 11b facing each other in the diameter direction of the frame 11, in such a manner as to extend in the axial direction of the frame 11.

The filter member 12 is made of, for example, metal mesh. The filter member 12 may be made integrally with the frame 11, or may be adhered to the frame 11 with an adhesive agent and the like. The filter member 12 is provided in a substantially rectangular-shaped space 11d which is bent in an arc shape and which is enclosed by the connection member 11b, the ring members 11a, 11a, the divided portion 15, and the like.

As shown in FIGS. 2(a), 2(b), 3(a), and 3(d), a first engagement unit 16 is formed at one end of the divided portion 15 of the frame 11, and a second engagement unit 17 is formed at the other end of the divided portion 15. The first engagement unit 16 and the second engagement unit 17 are engaged with each other, so that the engagement unit 18 is constituted by the first engagement unit 16 and the second engagement unit 17.

The first engagement unit 16 includes a first inclination surface 16a inclined with respect to the thickness direction (diameter direction) of the frame 11, and includes a recessed portion 16b.

The first inclination surface 16a is formed with an inclination angle of about 45 degrees so as to extend from the position which is about half of the thickness (the thickness of the frame 11 in the diameter direction) of the engagement unit 18 made by engaging the first engagement unit 16 and the second engagement unit 17 to the inner peripheral surface of the frame 11.

Figure 2B:
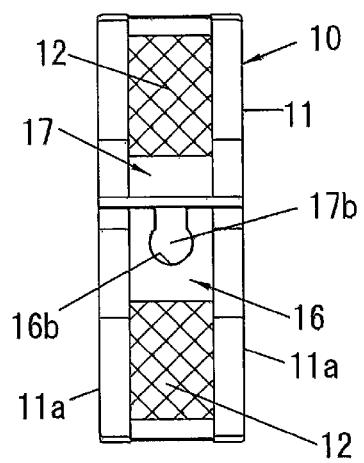
FIGS. 2(a) and 2(b) illustrate an example of a control valve filter.
Figure 2A:
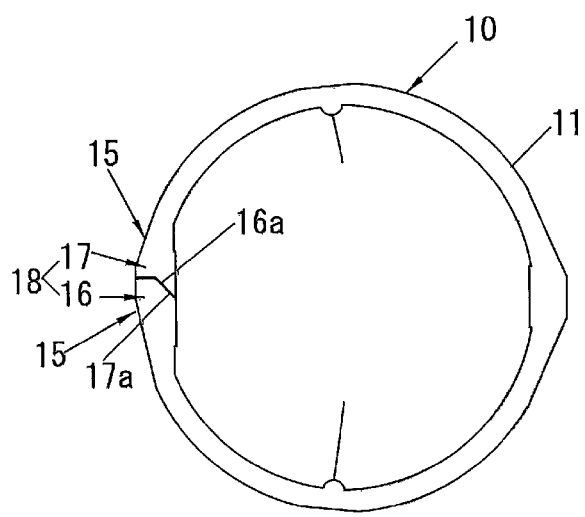

As shown in FIG. 2(b), the recessed portion 16b is formed in a substantially keyhole shape, and accordingly, the recessed portion 16b is formed so that the width of the opening portion (the width of the opening portion at the end surface side of the frame 11) is narrower than that at the deeper side. The recessed portion 16b is formed to penetrate in the thickness direction of the frame 11, and is formed in a substantially central portion in the width direction of the first engagement unit 16 (the axial direction of the frame 11). As described above, the recessed portion 16b is also open to the external peripheral surface of the frame 11, and therefore, through this opening, the projection portion 17b explained later can be engaged with the recessed portion 16b from the outside to the inside in the diameter direction of the frame 11.

The second engagement unit 17 includes a second inclination surface 17a inclined with respect to the thickness direction (diameter direction) of the frame 11, and includes a projection portion 17b.

The second inclination surface 17a is formed with an inclination angle of about 45 degrees so as to extend from the position which is about half of the thickness (the thickness of the frame 11 in the diameter direction) of the engagement unit 18 to the inner peripheral surface of the frame 11. Therefore, the second inclination surface 17a can be in close contact with the first inclination surface 16a. More specifically, the inclination direction of the second inclination surface 17a is opposite to the inclination direction of the first inclination surface 16a, and the inclination of the second inclination surface 17a in the inclination direction and the inclination thereof in the width direction perpendicular to the inclination direction are the same as those of the first inclination surface 16a.

The projection portion 17b is formed in a shape so as to engage (fit) with the recessed portion 16b in a substantially keyhole shape. More specifically, the projection portion 17b includes the main body of the projection portion in the disk shape and the neck portion formed with the main body of the projection portion, and the diameter of the main body of the projection portion is more than the thickness of the neck portion.

The projection portion 17b is formed at a substantially central portion in the width direction of the second engagement unit 17 (in the axial direction of the frame 11) (see FIG. 2b), and, as shown in FIGS. 3(a) and 3(d), the upper surface of the projection portion 17b is an inclination surface 17d which is extending to the end of the projection portion 17b so as to incline to the inner side in the diameter direction of the frame 11.

Further, the first engagement unit 16 includes a first contact surface 16c in parallel with the thickness direction of the frame 11. The first contact surface 16c is formed to be continuous with the first inclination surface 16a, and is of a height about half of the thickness of the engagement unit 18.

The second engagement unit 17 includes a second contact surface 17c in parallel with the thickness direction of the frame 11. The second contact surface 17c is formed to be continuous with the second inclination surface 17a, and is of a height about half of the thickness of the engagement unit 18.

The first contact surface 16c and the second contact surface 17c are formed to be of the same size, and when the first inclination surface 16a and the second inclination surface 17a come into close contact with each other, the first contact surface 16c and the second contact surface 17c are configured to be in contact with each other.

The control valve filter 10 configured as described above is attached to the peripheral groove 3 of the control valve 1 as explained below.

More specifically, first, the divided portion 15 of the control valve filter 10 is attached to the peripheral groove 3 of the control valve 1 so that the divided portion 15 of the control valve filter 10 is slightly expanded against the elastic force of the frame 11, and this control valve filter 10 is attached from the divided portion 15 to the peripheral groove 3 along the peripheral groove 3.

At this occasion, while the recessed portion 16b of the first engagement unit 16 formed on one end of the divided portion 15 is elastically and slightly pulled up toward the outer side with respect to the projection portion 17b of the second engagement unit 17 formed at the other end of the divided portion 15, the first engagement unit 16 is overridden on the inclination surface 17d of the projection portion 17b, and thereafter, using the elastic recover force, the recessed portion 16b is caused to slide along the inclination surface 17d at the inner side in the diameter direction of the frame 11, whereby the recessed portion 16b can be easily engaged with the projection portion 17b.

As described above, the recessed portion 16b is engaged with the projection portion 17b, so that the recessed portion 16b and the projection portion 17b are not disconnected in the peripheral direction of the frame 11.

When the recessed portion 16b is engaged with the projection portion 17b from the outside to the inside in the diameter direction of the frame 11, the first inclination surface 16a comes into close contact with the second inclination surface 17a, and the first contact surface 16c comes into contact with the second contact surface 17c, so that the first engagement unit 16 is engaged with the second engagement unit 17.

When the first engagement unit 16 is engaged with the second engagement unit 17, the projection portions 11c, 11c formed on the inner peripheral surface of the frame 11 come into contact with the bottom surface of the peripheral groove 3 of the control valve 1, thus functioning as a stopper for stopping rotation.

Subsequently, a control valve insertion structure in which the control valve 1 having the control valve filter 10 attached thereto is inserted into an attachment hole 20a formed in a device 20 will be explained with reference to FIG. 5.

Figure 5:
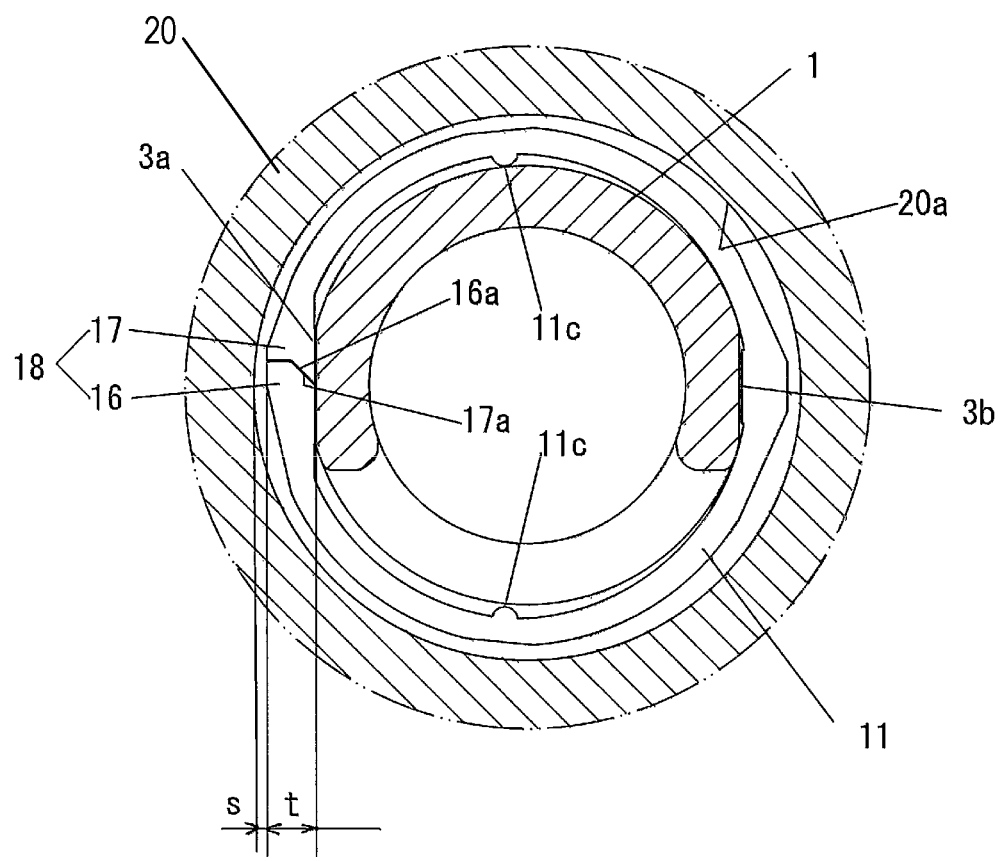
FIG. 5 is a transverse sectional view illustrating an example of a control valve insertion structure.

FIG. 5 is a transverse sectional view illustrating the control valve 1 inserted into the attachment hole 20a. As shown in FIG. 5, the attachment hole 20a is formed to have a circular shape in the cross section, and the control valve 1 is inserted into the inside of the attachment hole 20a with a predetermined gap therebetween.

As described above, the control valve 1 has the control valve filter 10 attached thereto, and a thickness t of the engagement unit 18 obtained by engaging the first engagement unit 16 and the second engagement unit 17 of the control valve filter 10 is more than a gap s between the external peripheral surface of the frame 11 and the inner peripheral surface of the attachment hole 20a.

A flat surface 3a is formed on a part of the bottom surface of the peripheral groove 3 of the control valve 1, and the flat surface of the back surface of the engagement unit 18 is in close contact with the flat surface 3a.

On a part of the bottom surface of the peripheral groove 3, a flat surface 3b is formed to face the diameter direction of the flat surface 3a and the control valve 1, and the flat surface formed on the frame is in close contact with this flat surface 3b.

According to the present embodiments, when the control valve filter 10 is attached to the peripheral groove 3 formed on the external peripheral surface of the control valve 1, the recessed portion 16b of the control valve filter 10 is engaged with the projection portion 17b from the outside to the inside in the diameter direction of the frame 11, and the first inclination surface 16a comes into close contact with the second inclination surface 17a, so that the first engagement unit 16 is engaged with the second engagement unit 17. This engagement is not a so-called snap-fit, and therefore, this can prevent the recessed portion 16b and the projection portion 17b from being deformed or damaged.

The divided portion 15 includes the recessed portion 16b, the projection portion 17b, the first inclination surface 16a, and the second inclination surface 17a, which is a relatively simple shape, and therefore, more components are not required, and this saves the trouble in the production.

Further, when the first engagement unit 16 is engaged with the second engagement unit 17, the second engagement unit 16 is overridden on the inclination surface 17d of the projection portion 17b, and thereafter, the recessed portion 16b is caused to slide along the inclination surface 17d at the inner side in the diameter direction of the frame 11, whereby the recessed portion 16b can be easily engaged with the projection portion 17b.

When the first inclination surface 16a and the second inclination surface 17a come into close contact with each other, the first contact surface 16c and the second contact surface 17c are in contact with each other, and therefore, the first inclination surface 16a and the second inclination surface 17a can be positioned to be reliably brought into close contact with each other, and this can prevent the first inclination surface 16a and the second inclination surface 17a from slipping.

Further, while the control valve 1 is inserted into the attachment hole 20a formed in the device 20, the thickness of the engagement unit 18 obtained by engaging the first engagement unit 16 and the second engagement unit 17 of the control valve filter 10 is more than the gap between the external peripheral surface of the frame 11 of the control valve filter 10 and the inner peripheral surface of the attachment hole 20a, and therefore, this does not increase the gap between the inner peripheral surface of the control valve filter 10 and the external peripheral surface of the control valve 1 having the control valve filter 10 attached thereto. Therefore, the engagement unit 18 is less likely to be detached because of the hydraulic pressure of the control fluid, and the projection portion 11c can function effectively, which is provided at the inner side of the filter to serve as the stopper for stopping rotation.

In the present embodiments, while the recessed portion 16b of the first engagement unit 16 is slightly pulled up to the outside with respect to the projection portion 17b of the second engagement unit 17, the recessed portion 16b is engaged with the projection portion 17b from the outside to the inside in the diameter direction of the frame 11, but instead of this configuration, while the projection portion 17b of the second engagement unit 17 is slightly pulled up to the outside with respect to the recessed portion 16b of the first engagement unit 16, the projection portion 17b is engaged with the recessed portion 16b from the outside to the inside in the diameter direction of the frame 11, so that the first engagement unit 16 and the second engagement unit are engaged with each other.

DESCRIPTION OF REFERENCE CHARACTERS

1 control valve
3 peripheral groove
10 control valve filter
11 frame
12 filter member
15 divided portion
16 first engagement unit
16a first inclination surface
16b recessed portion
16c first contact surface
17 second engagement unit
17b projection portion
17c second contact surface
17d inclination surface
18 engagement unit
20 device
20a attachment hole

What is claimed is:

1. A control valve filter that is attached to a peripheral groove formed on an external peripheral surface of a control valve and that is configured to filter a fluid flowing into or out of a port unit that is opened through the peripheral groove, the control valve filter comprising:
   a substantially ring-shaped frame; and
   a filter member provided on the frame,
   wherein the frame includes a divided portion formed at a peripheral portion of the frame,
   the divided portion includes a first engagement unit and a second engagement unit configured to engage with the first engagement unit,
   the first engagement unit has a recessed portion,
   the second engagement unit has a projection portion configured to engage with the recessed portion,
   a width of an opening portion of the recessed portion is narrower than a width at a deeper side of the recessed portion,
   when the first engagement unit is engaged with the second engagement unit, the projection portion is engaged with the recessed portion in a diameter direction of the frame, and
   the projection portion includes an inclined surface that extends to an end of the projection portion and inclines to an inner side in the diameter direction of the frame.

2. The control valve filter according to claim 1, wherein the first engagement unit has a first inclination surface that is inclined with respect to a thickness direction of the frame,
   the second engagement unit has a second inclination surface configured to be in close contact with the first inclination surface, and
   when the projection portion is engaged with the recessed portion from the diameter direction of the frame, the first inclination surface and the second inclination surface contact with each other.

3. The control valve filter according to claim 2, wherein the first engagement unit has a first contact surface that is parallel with the thickness direction of the frame,
   the second engagement unit has a second contact surface that is parallel with the thickness direction of the frame, and
   when the first inclination surface and the second inclination surface are in close contact with each other, the first contact surface and the second contact surface contact each other.

4. A control valve insertion structure in which a control valve having the control valve filter according to claim 3 is inserted into an attachment hole formed in a device,
   wherein a thickness of an engagement unit obtained by engaging the first engagement unit and the second engagement unit of the control valve filter is greater than a gap between an external peripheral surface of the frame and the attachment hole.

5. A control valve insertion structure in which a control valve having the control valve filter according to claim 2 is inserted into an attachment hole formed in a device,
   wherein a thickness of an engagement unit obtained by engaging the first engagement unit and the second engagement unit of the control valve filter is greater than a gap between an external peripheral surface of the frame and the attachment hole.

6. A control valve insertion structure in which a control valve having the control valve filter according to claim 1 is inserted into an attachment hole formed in a device,
   wherein a thickness of an engagement unit obtained by engaging the first engagement unit and the second engagement unit of the control valve filter is greater than a gap between an external peripheral surface of the frame and the attachment hole.

7. A control valve filter comprising:
   a substantially ring-shaped frame; and
   a filter member provided on the frame,
   wherein the frame includes a divided portion formed at a peripheral portion of the frame,
   the divided portion includes a first engagement unit and a second engagement unit configured to engage with the first engagement unit,
   the first engagement unit includes a recess,
   the second engagement unit has a projection portion configured to engage with the recess,
   a width of an opening of the recess is narrower than a width at a deeper side of the recess,
   when the first engagement unit is engaged with the second engagement unit, the projection portion is engaged with the recess in a direction from an outside of the frame toward an inside of the frame, and
   the projection portion includes an inclined surface that extends to an end of the projection portion and inclines to an inner side in a diameter direction of the frame.

8. The control valve filter according to claim 7, wherein the recess is keyhole shaped.

9. The control valve filter according to claim 7, wherein the frame includes a plurality of ring members that are connected to each other with a plurality of connection members.

10. The control valve filter according to claim 9, wherein at least one of the connection members includes a projection that projects from a back surface of the at least one of the connection member toward the inside of the frame.

11. A control valve comprising:
   a peripheral groove formed on an external peripheral surface of a main body of the control valve; and
   the control valve filter according to claim 7, wherein the divided portion of the control valve filter is attached to the peripheral groove.

* * * * *